(12) United States Patent
Clark

(10) Patent No.: US 9,910,658 B2
(45) Date of Patent: Mar. 6, 2018

(54) OPTIMIZATION OF DISTRIBUTION OF OVER-THE-AIR (OTA) UPDATES TO PORTABLE COMPUTING DEVICES

(75) Inventor: Christopher D. Clark, San Francisco, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 1733 days.

(21) Appl. No.: 13/289,370

(22) Filed: Nov. 4, 2011

(65) Prior Publication Data

US 2013/0114422 A1 May 9, 2013

(51) Int. Cl.
G06F 9/445 (2006.01)
H04N 21/262 (2011.01)
H04N 21/24 (2011.01)

(52) U.S. Cl.
CPC ......... *G06F 8/65* (2013.01); *H04N 21/26216* (2013.01); *H04N 21/24* (2013.01); *H04N 21/2402* (2013.01)

(58) Field of Classification Search
CPC ..... H04W 28/12; H04W 36/22; H04W 40/00; H04W 48/17; H04W 72/02; H04W 72/04; H04W 88/16; H04L 12/66; H04L 9/32; H04L 29/06
See application file for complete search history.

(56) References Cited

U.S. PATENT DOCUMENTS 6,996,393 B2 2/2006 Pyhalammi et al.
7,437,428 B1 10/2008 Muti et al.
9,131,408 B1 * 9/2015 Falsafi .................. H04W 48/18
2005/0120040 A1 6/2005 Williams et al.
2009/0249321 A1 * 10/2009 Mandyam et al. ........... 717/171
2011/0237238 A1 * 9/2011 Hassan et al. ............. 455/422.1
2011/0264778 A1 10/2011 McGregor et al.

FOREIGN PATENT DOCUMENTS

WO 2009120597 A1 10/2009

OTHER PUBLICATIONS

Patent Cooperation Treaty, "PCT Search Report and Written Opinion of the International Searching Authority" for International Application No. PCT/US2012/059336 dated Jan. 2, 2013, 13 pages.

* cited by examiner

*Primary Examiner* — Marsha D. Banks Harold
*Assistant Examiner* — Dharmesh Patel
(74) *Attorney, Agent, or Firm* — Faegre Baker Daniels LLP

(57) ABSTRACT

A system and apparatus for distributing updates to portable computing device are disclosed. A number of portable computing devices to receive update data is determined and a first number of invitations to update are transmitted to a subset of the portable computing devices to receive update data during a first event. Data describing network usage during the first event is received and the available network bandwidth is determined Based on the available network bandwidth, the size of the update data and network speed, a second number of invitations to update for transmission during a second event is determined In one embodiment, the available network bandwidth accounts for a threshold bandwidth and the bandwidth being used. This allows dynamic modification of the number of invitations based on available network bandwidth while allowing bandwidth usage to remain below the threshold bandwidth.

20 Claims, 4 Drawing Sheets

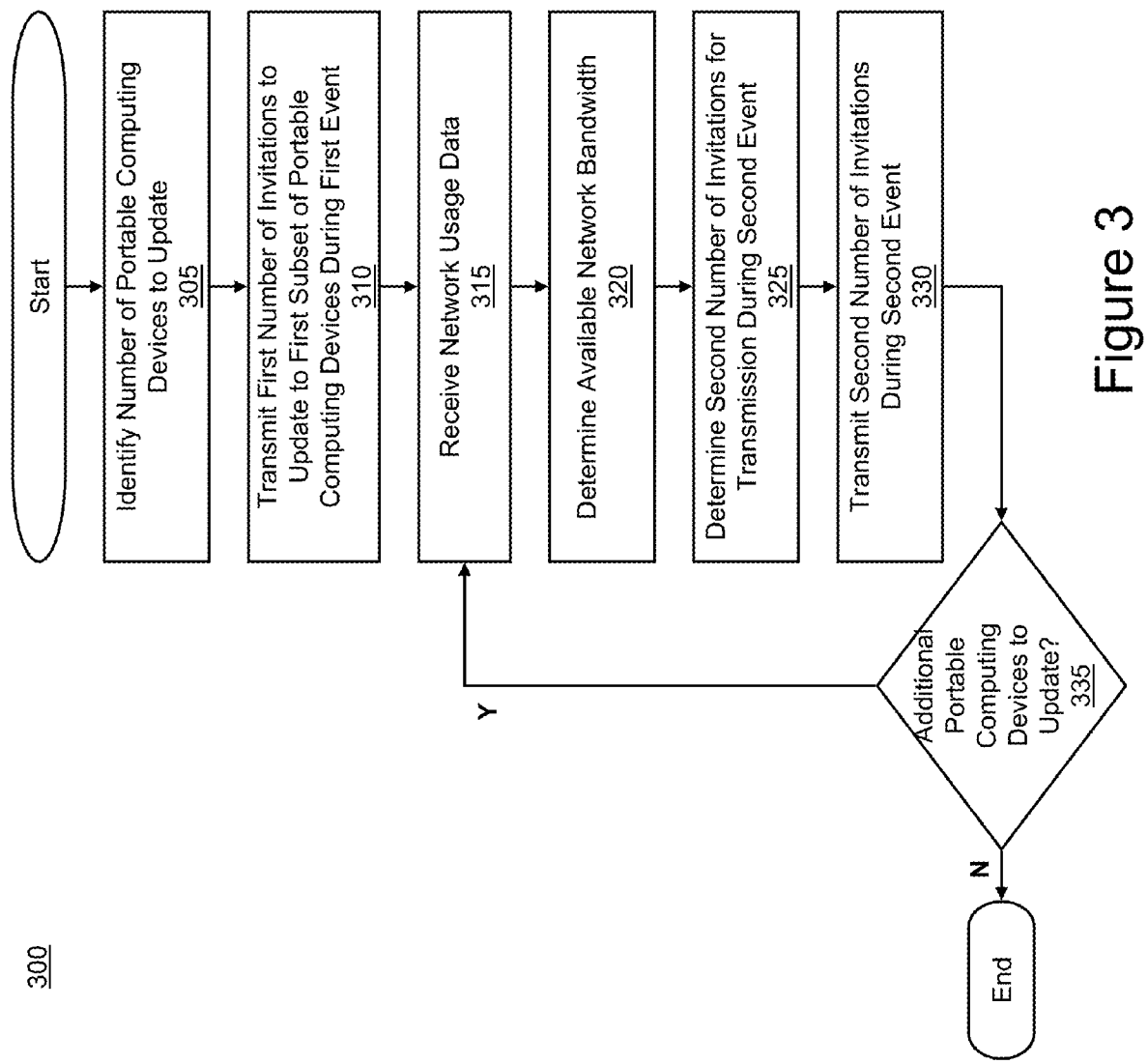

OPTIMIZATION OF DISTRIBUTION OF OVER-THE-AIR (OTA) UPDATES TO PORTABLE COMPUTING DEVICES

FIELD OF THE DISCLOSURE

The present disclosure generally relates to managing data downloads to a portable computing device and more specifically relates to modifying transmission of invitations for portable computing devices to update based on network resources.

BACKGROUND

Portable computing devices, such as smartphones or tablet computers, have become increasingly powerful and user-friendly. Increased network connectivity has further allowed portable computing devices to provide a wider range of functionalities and/or data. This functionality and connectivity has increased the number of portable computing devices being used.

Components of portable computing devices are periodically updated to include advancements or additions to a component. For example, an operating system executed by a portable computing device and/or applications executed by a portable computing device may be periodically updated to provide added functionality or to modify operation. Typically, a portable computing device receives update data from a source, such as a server, and executes the update data to update a component. For example, data describing an updated operating system or application is received by a portable computing device, which executes the data to update the operating system or the application.

Prior to increases in portable computing device use, when an update was available, a server transmitted an invitation to upgrade to the portable computing device. Subsequently, a portable computing device user responded to the invitation when convenient for the user and the portable computing device received update data responsive to the server receiving the response to the invitation. Because update data was transmitted after a response is received, this configuration reduced the likelihood of a sudden load on the servers or on the network. However, transmitting invitations to upgrade to multiple portable computing devices required manual issuance of batches of invitations, making this technique difficult to scale.

Hence, the increased number of portable computing devices and the increasing size of the update data to transmit have resulted in upgrade data being distributed through a push-based model. In the push-based model, servers transmit invitations to groups of portable computing devices, which automatically respond to the invitation upon receipt to retrieve upgrade data. This causes large spikes in network bandwidth use when upgrade data is transmitted to portable computing devices followed by periods of low bandwidth consumption until an additional group of portable computing devices receive update data.

The spikes in network bandwidth consumption caused by the push-based model may also result in increased costs. Many network carriers impose additional charges if bandwidth consumption exceeds a threshold value, and the spikes in network bandwidth consumption from the conventional push-based upgrade model often exceed the threshold bandwidth consumption value.

BRIEF DESCRIPTION OF THE DRAWINGS

The accompanying Figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 3 is a flow chart of a method for dynamic transmission of invitations to update based on network usage according to some embodiments.

Figure 1:
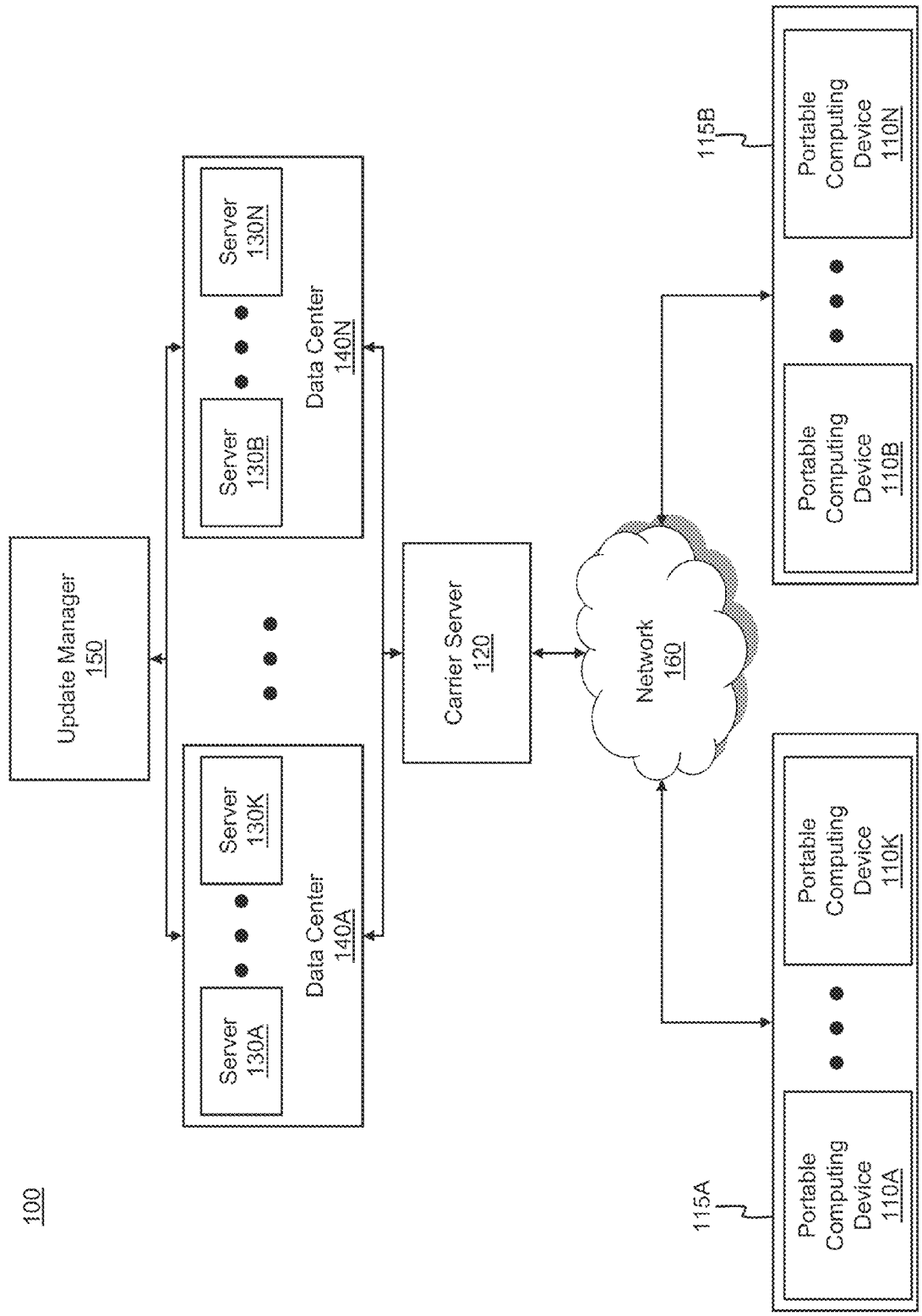
FIG. 1 is a block diagram of a computing system according to some embodiments.

Skilled artisans will appreciate that elements in the Figures are illustrated for simplicity and clarity and have not necessarily been drawn to scale. For example, the dimensions of some of the elements in the Figures may be exaggerated relative to other elements to help to improve understanding of embodiments of the present invention.

The apparatus and method components have been represented where appropriate by conventional symbols in the drawings, showing the specific details that are pertinent to understanding the embodiments of the present invention so as not to obscure the disclosure with details that will be readily apparent to those of ordinary skill in the art having the benefit of the description herein.

DETAILED DESCRIPTION

The following disclosure describes modifying transmission of invitations for portable computing devices to retrieve update data based on network usage. A number of portable computing devices to receive update data are determined For example, a version of a component stored by a portable computing device is determined and compared to a version of the update data to determine whether a portable computing device is to receive update data. In one embodiment, the portable computing devices receive data from one or more servers via a network. During a first event a first number of invitations are transmitted to a first subset of the portable computing devices to receive the update data. For example, a predetermined number of invitations are transmitted during the first event or invitations are transmitted to a predetermined percentage of the portable computing devices to receive the update.

Data describing usage of the network during the first event is received. For example, the received data describes an amount of network bandwidth used during the first event by portable computing devices receiving update data as well as used by other services during the first event. An available bandwidth is determined from the received data. In one embodiment, the available bandwidth is determined as the difference between a threshold bandwidth and the bandwidth used during the first event. Using the available bandwidth, a size of the update data and a network speed, a second number of invitations is determined For example, the size of the update data is divided by the network speed to calculate an update download time, and the available bandwidth is divided by the update download time to determine the second number of invitations. During a second event, the second number of invitations are transmitted to a second subset of the portable computing devices to receive update data.

In the following description, for purposes of explanation, numerous specific details are set forth to provide a thorough understanding of the invention. However, it will be apparent to one skilled in the art that the invention can be practiced without these specific details. In other instances, structures and devices are shown in block diagram form in order to avoid obscuring the invention.

System Overview

FIG. 1 is a block diagram of one embodiment of a computing system 100. In the embodiment shown by FIG. 1, the computing system 100 includes a plurality of portable computing devices 110A, 110B, 110K, 110N (also referred to individually and collectively using reference number 110), a carrier server 120, a plurality of data centers 140A, 140N (also referred to individually and collectively using reference number 140) and an update manager 150. In the embodiment shown by FIG. 1, data center 140A includes a plurality of servers 130A, 130K and data center 140N includes a plurality of servers 130B, 130N. Additionally, the carrier server 120 is coupled to the portable computing devices 110 via a network 160. However, in different embodiments, the computing system 100 may include different and/or additional components than those depicted in FIG. 1.

A portable computing device 110 is any device with data processing and data communication capabilities. Examples of a portable computing device 110 include a smartphone, a tablet computer, a netbook computer, a laptop computer or any other suitable device. The portable computing device 110 receives data from the carrier server 120 via the network 160 and, in some embodiments, may exchange data with one or more additional servers (not shown) via the network 160.

In one embodiment, a portable computing device 110 receives an invitation via the network 160 and transmits a response to the invitation to a server 130 via the network 160 and/or the carrier server 120 to retrieve update data. The portable computing device 110 receives update data from the network 160 and/or the carrier server 120 after the server 130 receives the response. The portable computing device 110 executes the received update data to modify a component executed by the portable computing device 110. For example, executing the update data modifies an operating system or an application stored by the portable computing device 110.

In some embodiments, such as the system 100 illustrated by FIG. 1, the portable computing devices 110 comprise logical groups 115A, 115B (also referred to individually and collectively using reference number 115). In one embodiment, a group 115 is associated with a data center 140, further described below, so that portable computing devices within a group 115 receive data from the associated data center 140. For example, portable computing devices 110A, 110K in group 115A exchange data with data center 140A and portable computing devices 110B, 110N in group 115B exchange data with data center 140N. Alternatively, a data center 140A exchanges data with portable computing devices 110 associated with multiple groups 115A, 115B. In one embodiment, a server 130 in a data center 140 includes identifiers of portable computing devices 110 associated with the data center 140 to specify a group 115 associated with the data center 140.

The carrier server 120 is one or more computing devices having data processing and data communication capabilities that exchange data with one or more portable computing devices 110 via the network 160. In one embodiment, the carrier server 120 also maintains or configures one or more components of the network 160 to enable communication between portable computing devices 110 and the carrier server 120. In one embodiment, the carrier server 120 receives data from a server 130 in a data center 140 and allocates resources of the network 160 to transmit data from the server 130 to a portable computing device 110.

A server 130 is one or more computing devices having data processing and data communication capabilities that exchange data with one or more portable computing devices 110 via the carrier server 120 and the network 160. In one embodiment, a server 120 provides data, such as update data, via the network 160 and the carrier server 120 to a portable computing device 110 and/or receives data from a portable computing device 110 via the network 160 and/or the carrier server 120.

In one embodiment, such as the one shown by FIG. 1, servers 130 are grouped into data centers 140. FIG. 1 shows an embodiment where data center 140A includes server 130A and server 130K while data center 140N includes server 130B and server 130N. In one embodiment, one or more servers 130 within a data center 140 exchange data with one or more portable computing devices 110 included in a group 115. For example, group 115A exchanges data with one or more servers 130 in data center 140A and group 115B exchanges data with one or more servers 130 in data center 140N. Alternatively, a data center exchanges data with multiple groups 115A, 115B. In one embodiment, a data center 140 includes servers 130 that are grouped together based on the geographic location of the servers 130. This allows servers 130 in a certain geographic region to be included in the same data center 140. In other embodiments, servers 130 may be grouped into a data center 140 based on any suitable criteria.

The update manager 150 comprises one or more computing devices determining a number of invitations to update to transmit to portable computing devices during a time interval. The time interval during which invitations are transmitted is also referred to herein as an "event." The update manager 150 communicates with servers 130A, 130B, 130K, 130N in data centers 140A, 140N to transmit an invitation from a server 130 to a portable computing device 110. An invitation indicates that update data is available for retrieval by a portable computing device 110. Responsive to receiving an invitation, a portable computing device 110 initiates retrieval of the update data from a server 130. The update manager 150 is further described below in conjunction with FIG. 2.

To more efficiently use network bandwidth when updating portable computing devices 110, the update manager 150 receives data from one or more servers 130 and/or from one or more data centers 140. As further described below in conjunction with FIG. 3, the update manager 150 modifies the number of invitations transmitted to portable computing devices 110 based on the data from a server 130 and/or from a data center 140. For example, the update manager 150 receives data describing the network bandwidth available to various data centers 140A, 140N and/or available to various servers 130A, 130B, 130K, 130N and modifies the number of invitations transmitted responsive to the available bandwidth. For example, if a server 130 has additional network bandwidth available for use in a first event, the update manager 150 increases the number of invitations transmitted using the sever 130 during a subsequent event.

The network 160 is a conventional type for data, video and/or audio transmission. In various embodiments, the network 160 is a wired network, a wireless network or a combination of wireless and wired networks. The network 160 may have any number of configurations such as a star configuration, a token ring configuration or another configuration known in the art. Furthermore, the network 160 may comprise a local area network (LAN), a wide area network (WAN) (e.g., the Internet), and/or any other interconnected data path across which multiple devices may communicate. In yet another embodiment, the network 160 may be a peer-to-peer network. The network 160 may also be coupled to or include portions of a telecommunications network for sending data in a variety of different communication protocols, such as those used for transmission control protocol/Internet protocol (TCP/IP), satellite link and/or cable television communication. For example, the network 160 may transmit voice data using one or more of a Global System for Mobile (GSM) communication system, Code Division Multiple Access (CDMA) system, Universal Mobile Telecommunications System (UMTS) or any other suitable protocols.

The network 160 may also transmit data using one or more of General Packet Radio Service (GPRS), third-generation (3G), or greater, mobile network, fourth-generation (4G), or greater, mobile network, High Speed Download Packet Access (HSDPA), High Speed Uplink Packet Access (HSUPA), Long-Term Evolution (LTE), Worldwide Interoperability for Microwave Access (WiMax) or any other suitable protocol. In yet another embodiment, the network 160 includes Bluetooth communication networks or a cellular communications network for sending and receiving data such as via short messaging service (SMS), multimedia messaging service (MMS), hypertext transfer protocol (HTTP), direct data connection, wireless application protocol (WAP), email or other types of data known in the art.

Network resources are used when data is exchanged between a server 130 and a portable computing device 110. In one embodiment, the carrier server 120 allocates network resources, such as network bandwidth, among different servers 130 or among different data centers 140. As further described below, the update manager 150 modifies the number of invitations transmitted during different events to better use the network resources allocated to a server 130 or to a data center 140.

Figure 2:
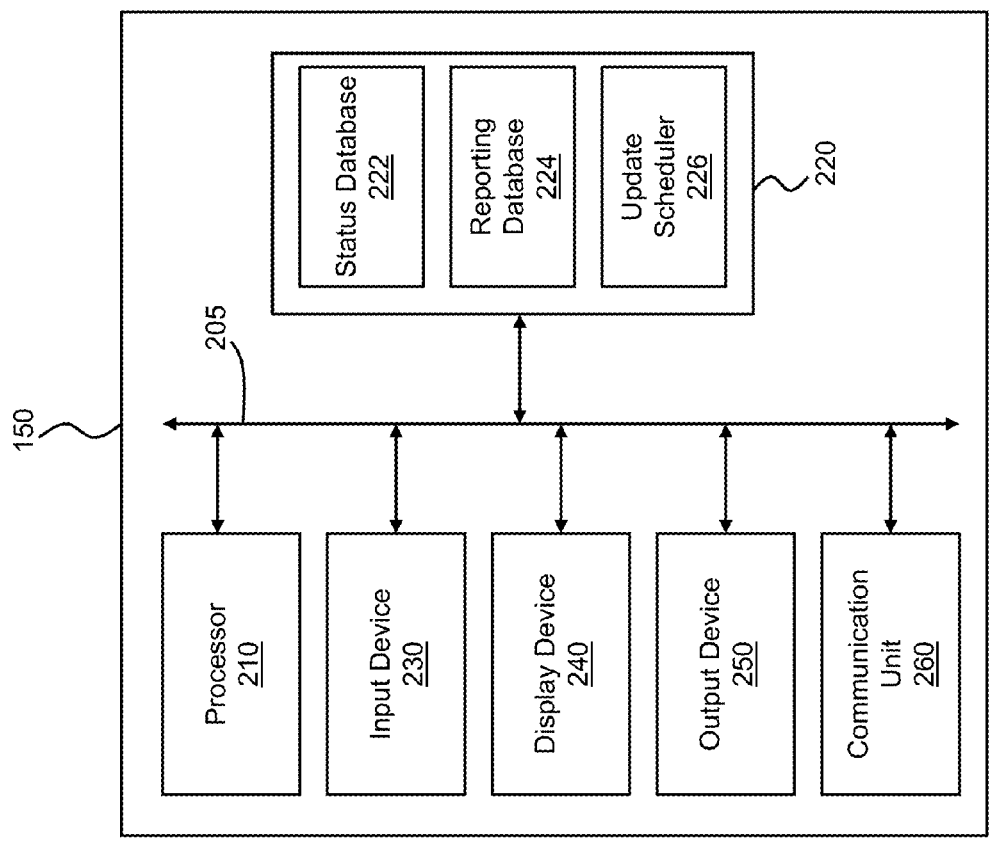
FIG. 2 is a block diagram of an update manager according to some embodiments.

FIG. 2 is a block diagram of one embodiment of an update manager 150. In the embodiment shown by FIG. 2, the update manager 150 includes a processor 210, a storage device 220, an input device 230, a display device 240, an output device 250 and a communication unit 260 coupled together via a bus 205. However, in different embodiments, the update manager 150 may include different and/or additional components than those illustrated by FIG. 2. Additionally, in some embodiments, the update manager 150 may include fewer components than those illustrated by FIG. 2.

The processor 210 processes data or instructions and may comprise various computing architectures. For example, the processor 210 processes data or instructions using a complex instruction set computer (CISC) architecture, a reduced instruction set computer (RISC) architecture, an architecture implementing a combination of instruction sets or any other suitable instruction set. Although FIG. 2 shows a single processor 210, in other embodiments, the update manager 150 may include multiple processors. The processor 210 transmits, processes and/or retrieves data from the storage device 220, the input device 230, the display device 240, the output device 250 and/or the communication unit 260.

The storage device 220 stores data and/or instructions that, when executed by the processor 210, cause the processor 210 to perform one or more actions or to provide one or more types of functionality. The data and/or instructions included in the storage device 220 may comprise computer-readable code that, when executed by the processor 210, perform one or more of the methods described herein and/or provide at least a subset of the functionality described herein. The storage device 220 may comprise a dynamic random access memory (DRAM), a static random access memory (SRAM), a hard disk, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM), a Flash memory or another memory device known in the art. The storage device 220 may be a persistent storage device, a non-persistent storage device or a combination of a persistent storage device and a non-persistent storage device in various embodiments. The storage device 220 is coupled to the processor 210, the input device 230, the display device 240, the output device 250 and the communication unit 260 via the bus 205.

In the embodiment shown by FIG. 2, the storage device 220 includes a status database 222, a reporting database 224 and an update scheduler 226. In other embodiments, the storage device 220 may include different and/or additional components than those shown in FIG. 2. The status database 222 stores data received from one or more servers 130 and/or from one or more data centers 140 describing resource usage. In one embodiment, the status database 222 may also store data received from the carrier server 120 describing network resource usage. For example, the status database 222 includes an amount of network bandwidth in use, an amount of available network bandwidth, data describing portable computing devices 110 and/or additional data describing components of the system 100. In one embodiment, the status database 222 is updated in real-time to reflect current resources used by components of the system 100. The status database 222 also identifies a version of one or more components of a portable computing device 110, allowing identification of portable computing devices 110 including a component to be updated. For example, the status database 222 includes a portable computing device identifier and a version number of an operating system and/or an application stored on the portable computing device 110. In one embodiment, the version number is compared to a current version number to determine whether to transmit update data for the operating system or application. In one embodiment, the status database 222 also includes a threshold bandwidth. In one embodiment, use of bandwidth in excess of the threshold bandwidth results in additional cost, such as increased compensation to the carrier.

The reporting database 224 is a copy of the status database 222, allowing data describing the system 100 to be accessed without affecting modification of the status database 222. In one embodiment, the status database 222 is periodically copied to the reporting database 224. For example, at a predetermined time interval, such as a four hour interval, contents of the status database 222 are copied to the reporting database 224. In one embodiment, the reporting database 224 is accessed to determine portable computing devices 110 to receive update data, as described above.

The update scheduler 226 comprises instructions that, when executed by the processor 210, determines a number of invitations for transmission to portable computing devices 110 during an event. An invitation specifies that update data is available for a component included in a portable computing device 110. Receiving an invitation causes the portable computing device 110 to retrieve the update data from a server 130 for installation. By determining the number of invitations transmitted to portable computing devices 110, the update scheduler 226 is able to modify the bandwidth used during an interval. Additionally, the update scheduler 226 also determines the time interval during which invitations are transmitted to portable computing devices 110 to determine when portable computing devices 110 retrieve update data from one or more servers 130. By determining the number of invitations sent during different time intervals, or during different events, the update scheduler 226 modifies network bandwidth used for updating as well as the time when network bandwidth is used for updating.

In one embodiment, the update scheduler 226 includes data describing update data for transmission to portable computing devices 110. For example, the update scheduler 226 includes an identifier associated with update data, a size of the update data, a version number associated with the update data and/or any other suitable data describing the update data. In one embodiment, the update scheduler 226 uses the size of the update data as well as data retrieved from the status database 222, or from the reporting database 224, to determine a number of invitations to send during an event. For example, the update scheduler 226 retrieves an available network bandwidth and a network speed from the status database 222, or from the reporting database 224, and divides the size of the update data by the network speed to determine an update download time then divides the available bandwidth by the update download time to determine a number of invitations. The update scheduler 226 then transmits the determined number of invitations during a time interval, also referred to as an "event." The update scheduler 226 is further described below in conjunction with FIG. 3.

The input device 230 is any device configured to receive input and to communicate the received input to the processor 210, to the storage device 220 or to another component of the update manager 150. For example, the input device 230 comprises a cursor controller, a touch-sensitive display or a keyboard. In one embodiment, the input device 230 includes an alphanumeric input device, such as a keyboard, a key pad, representations of such created on a touch-sensitive display or another device adapted to communicate information and/or commands to the processor 210 or to the storage device 220. In another embodiment, the input device 230 comprises an input device for communicating positional data as well as data or commands to the processor 210 or to the storage device 220 such as a joystick, a mouse, a trackball, a stylus, a touch-sensitive display, directional keys or another suitable input device known in the art.

The display device 240 is a device that displays electronic images and/or data. For example, the display device 240 comprises an organic light emitting diode display (OLED), a liquid crystal display (LCD) or any other device such as a monitor. In one embodiment, the display device 240 includes a touch-sensitive transparent panel for receiving data or allowing other interaction with the images and/or data displayed by the display device 240.

The output device 250 comprises one or more devices that convey data or information to a user of the update manager 150. For example, the output device 250 includes one or more speakers or headphones for presenting audio data to a user. As another example, the output device 250 includes one or more light emitting diodes (LEDs) or other light sources to provide visual data to a user. As another example, the output device 250 includes one or more devices for providing vibrational, or haptic, feedback to a user. The above are merely examples and the output device 250 may include one or more devices for providing auditory output, tactile output, visual output, any combination of the preceding or any other suitable form of output.

The communication unit 260 transmits data from the update manager 150 to one or more servers 130 or data centers 140 and/or receives data from one or more data centers 140, one or more servers 130 and/or from the carrier server 120. In one embodiment, the communication unit 260 comprises a wireless transceiver that transmits and/or receives data using one or more wireless communication protocols. For example, the communication unit 260 includes one or more wireless transceivers transmitting and/or receiving data using one or more wireless communication protocols, such as IEEE 802.11 a/b/g/n (WiFi), Global System for Mobile (GSM), Code Division Multiple Access (CDMA), Universal Mobile Telecommunications System (UMTS), General Packet Radio Service (GPRS), third-generation (3G), or greater, mobile network, fourth-generation (4G), or greater, mobile network, High Speed Download Packet Access (HSDPA), High Speed Uplink Packet Access (HSUPA), Long-Term Evolution (LTE), Worldwide Interoperability for Microwave Access (Wi-Max), BLUETOOTH® or another wireless communication protocol. In another embodiment, the communication unit 260 is a network adapter or other type of wired communication port for communicating with the network 160 or with another portable computing device 110 using a wired communication protocol, such as Universal Serial Bus (USB), Ethernet or another suitable wired communication protocol. In yet another embodiment, the communication unit 260 comprises a combination of one or more transceivers and a wired network adapter, or similar wired device.

Methods

FIG. 3 is a flow chart of a method 300 for transmission of invitations to update a component stored by a portable computing device 110 responsive to network usage. In one embodiment, the steps illustrated by the method 300 shown by FIG. 3 are implemented by instructions for performing the described actions embodied or stored within a non-transitory computer readable storage medium that, when executed by a processor 210, provide the functionality further described below. Examples of a non-transitory computer readable storage medium, such as the storage device 220, include flash memory, random access memory (RAM) or any other suitable medium known to one skilled in the art.

The method 300 may be implemented in embodiments of hardware, software or combinations of hardware and software. In one embodiment, instructions for performing the actions described below are stored in the storage device 220 of the update manager 150, such as in the update scheduler 226, and execution of the instructions by the processor 210 performs the actions described below. Moreover, in some embodiments, the method 300 includes different and/or additional steps than those shown by FIG. 3.

The update scheduler 226 identifies 305 a number of portable computing devices 110 to update. In one embodiment, the update scheduler 226 retrieves data from the reporting database 224, or from the status database 222, describing a version of a component of a portable computing device 110 and compares the retrieved version to a version associated with the update data. For example, the update scheduler 226 identifies 305 a number of portable computing device identifiers associated with a component having a version older than a version of the update data. As another example, the update scheduler identifies a number of portable computing devices 110 associated with a data center 140, allowing portable computing devices 110 associated with the data center 140 to be updated.

In one embodiment, the status database 222 or the reporting database 224 identifies the server 130 or data center 140 providing data to portable computing devices 110 as well as a component version for the portable computing devices 110, and the update scheduler 226 determines a number of portable computing devices 110 to be updated based on the associated data center 140 or associated server 130. As another example, the update scheduler 226 determines 305 a number of portable computing devices 110 within a group 115 to be updated.

The update scheduler 226 then transmits 310 a first number of invitations to a first subset of portable computing device 110 to be updated. In one embodiment, the first number of invitations are transmitted from the update scheduler 226 to one or more servers 130, which may be in different data centers 140. The servers 130 transmit the invitations to the first subset of portable computing devices 110 via the carrier server 120 and the network 160. Alternatively, the update scheduler 226 transmits 310 identifiers associated with the first subset of portable computing devices 110 to one or more servers 130, which may be in different data centers 140, and the servers 130 transmit invitations to the identified portable computing devices 110 via the carrier server 120 and the network 160.

In one embodiment, the first number of invitations is a predetermined number of invitations. Alternatively, the first number of invitations is a predetermined percentage of the number of portable computing devices 110 to update. In another embodiment, the update scheduler 226 transmits 310 an invitation at periodic intervals within the first event and halts transmitting 310 invitations when the time associated with the first event lapses. For example, the first event is a two-hour time interval and the update scheduler 226 transmits 310 an invitation to a portable computing device 110 to be updated at three-minute intervals within the two-hour first event, resulting in transmission of 40 invitations during the first event.

After transmitting the first number of invitations during the first event, the update scheduler 226 receives 315 data describing network usage during the first event from the carrier server 120 and/or from one or more servers 130, which may be in different data centers 140. In one embodiment, the received data describes the amount of bandwidth used during the first event. For example, the received network data describes the amount of bandwidth used by different servers 130, allowing the update scheduler 226 to determine the amount of bandwidth used by servers 130 or by different data centers 140 by combining the bandwidth used by servers 130 included in a data center 140. The network usage data describes network resources used by the retrieval of update data as well as network resources used by different services occurring during the first event. By receiving 315 network usage data after transmitting 310 the first number of invitations, the update scheduler 226 obtains a description of network usage when the first subset of portable computing devices 110 are receiving the update data. This allows the update scheduler 226 to modify the number of invitations sent during the second event based on network resources consumed by updating as well as other services.

Using the received network usage data, the update scheduler 226 determines 320 the available bandwidth of the network 160. In one embodiment, the update scheduler 226 determines 320 the available bandwidth for a particular server 130 or for a particular data center 140. Alternatively, the update scheduler 226 determines 320 the bandwidth available for use by multiple data centers 140.

For example, the update scheduler 226 determines 320 the available bandwidth by calculating the difference between a threshold bandwidth and the bandwidth in use. Data stored in the update scheduler 226 identifies the threshold bandwidth, which may be determined based on various implementation criteria, such as bandwidth usage cost, network performance or other suitable information. In one embodiment, the update scheduler 226 determines 320 the available bandwidth for a data center 140 based on the difference between the threshold bandwidth and the bandwidth used by the data center 140. In another embodiment, the update scheduler 226 determines 320 the available bandwidth for a server 130 based on the difference between the threshold bandwidth and the bandwidth used by the server 130.

Based on the available bandwidth, the update scheduler 226 determines 325 a second number of invitations for transmission during a second event. In one embodiment the update scheduler 226 includes data describing a size of the update data and receives 315 network usage data describing a speed of the network 160 or retrieves data describing the speed of the network from the status database 222 or from the reporting database 224. The update scheduler 226 divides the size of the update data by the network speed to determine an update download time and divides the available bandwidth by the update download time to determine 325 the second number of invitations. By determining 325 the second number of invitations for a data center 140 based on available bandwidth, the update scheduler 226 modifies the number of invitations sent from the data center 140 or from the server 130 to efficiently use the available bandwidth.

During a second event, the second number of invitations are transmitted 330 from the update manager 150 to a second subset of portable computing device 110 to be updated. In one embodiment, the second number of invitations are transmitted 330 from the update scheduler 226 to one or more servers 130, which transmit 330 the invitations to the second subset of portable computing devices 110 via the carrier server 120 and the network 160. Alternatively, the update scheduler 226 transmits 330 identifiers associated with the second subset of portable computing devices 110 to one or more servers 130, which transmit the invitations to the identified portable computing devices 110 via the carrier server 120 and the network 160.

After transmitting 330 the second number of invitations, the update scheduler 226 determines 335 whether additional portable computing devices 110 are to be updated. Responsive to determining 330 that no additional portable computing devices 110 are to be updated, the method 300 ends. Responsive, to determining 330 one or more portable computing devices 110 remain to be updated, the update scheduler 226 receives 315 network usage data for the second event, determines 320 available network bandwidth, determines 325 a number of invitations for transmission during an additional time interval and transmits 330 the determined number of invitations during the additional time interval, as further described above.

By determining 320 available network bandwidth from received network usage data describing network resources used during a first event when update data was retrieved by a subset of portable computing devices 110, the method 300 accounts for network usage both by update retrieval and by other services. Determining 325 the number of invitations sent during a second event based on available network bandwidth allows the number of invitations to be increased or decreased based on available network bandwidth. The method 300 may account for a threshold bandwidth when determining the available bandwidth so that bandwidth consumption when update data is retrieved does not exceed a threshold bandwidth, preventing additional costs from being incurred or network performance from being degraded. Additionally, the method 300 allows a portable computing device 110 to download update data as fast as possible, allowing the portable computing device 110 to shut down its radio or other communication device more quickly, minimizing power consumption during updating.

EXAMPLE OPERATION

Figure 4A:
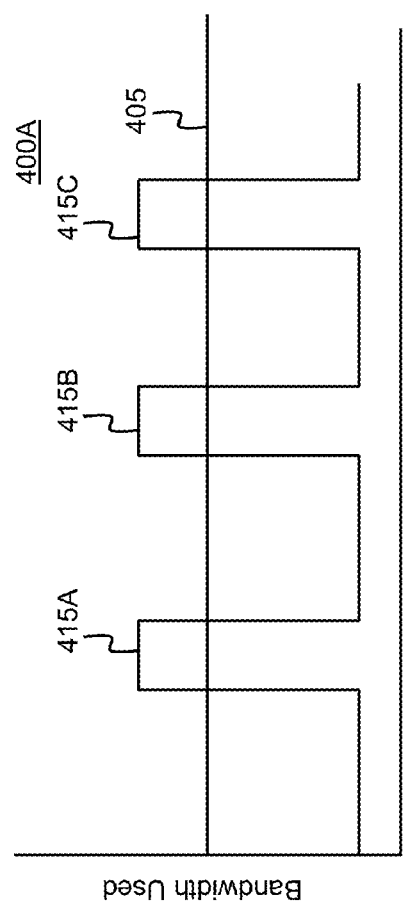
FIG. 4A is a graphical representation of bandwidth usage according to conventional updating techniques.

FIG. 4A is a graphical representation 400A of bandwidth usage by conventional updating techniques. In FIG. 4A, the threshold bandwidth 405 is identified to illustrate how conventional update techniques often cause bandwidth usage to exceed the threshold bandwidth 405 when update data is retrieved. For purposes of illustration, FIG. 4A shows three update intervals 415A, 415B, 415C during which invitations to update are transmitted to portable computing devices 110 and the portable computing devices 110 retrieve update data from one or more servers 130. Because conventional techniques push updates to portable computing devices 110 by transmitting a large number of invitations at one time, significant network bandwidth is consumed when the portable computing devices 110 respond to the invitations by retrieving update data. As shown in the example of FIG. 4A, during the update intervals 415A, 415B, 415C, bandwidth usage exceeds the threshold bandwidth 405, impairing performance of updating as well as other services using the network.

Figure 4B:
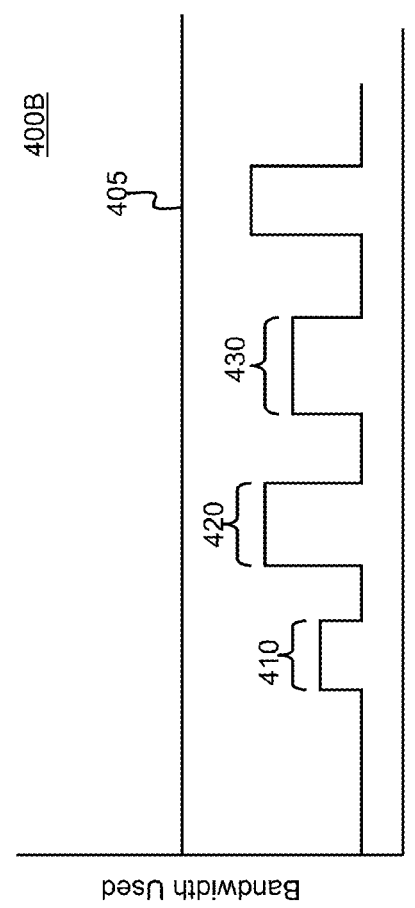
FIG. 4B is a graphical representation of bandwidth usage according to some embodiments.

In contrast, FIG. 4B shows a graphical representation 400B of bandwidth usage according to some embodiments, such as use of the method 300 described in conjunction with FIG. 3. In FIG. 4B, a first event 410, a second event 420 and a third event 430 are identified for purposes of illustration. As described above, a first number of invitations are transmitted during the first event 410 to a first subset of portable computing devices 110. In one embodiment, a predetermined number of invitations are transmitted during the first event 410. As shown by FIG. 4B, transmitting the first number of invitations to a subset of the portable computing devices 110 uses less than the threshold bandwidth 405.

As described above in conjunction with FIG. 3, network usage data is received by the update manager 150 describing network resource usage during the first event 410. The update manager 150 determines the number of invitations to transmit during the second event 420 based on the network usage during the first event 410. From the network usage data, the update manager 150 determines the available network bandwidth and determines the number of invitations to transmit during the second event 420 from the available bandwidth as well as the size of the update data and the network speed. In the example shown by FIG. 4B, the number of invitations to transmit during the second event 420 is increased from the number of invitations transmitted during the first event 410. For example, the network usage data received after the first event 410 may indicate that the network 160 had excess bandwidth available during the first event 410, so the second event 420 includes more invitations to use the excess bandwidth.

After the second event 420, the update manager 150 also receives data describing network usage during the second event 420, allowing the update manager 150 to modify the number of invitations to transmit during the third event 430 accordingly. In the example shown by FIG. 4B, the number of invitations transmitted during the third event 430 is reduced, causing a corresponding reduction in network bandwidth usage. For example, additional services may consume additional network bandwidth during the second event 420, causing the update manager 150 to reduce the number of invitations for transmission during the third event 430 to prevent bandwidth usage from exceeding the threshold bandwidth 405 during the third event 430.

As shown in the example of FIG. 4B, the method 300 described above in conjunction with FIG. 3 transmits of a number of invitations during different time intervals, or "events," and modifies the number of invitations to be transmitted in a subsequent event based on network usage during the prior event. Modifying the number of invitations prevents network usage from exceeding a threshold bandwidth, which may impair performance of one or more services or result in additional costs being incurred during updating. Additionally, this dynamic modification of the number of invitations reduces the time used to transmit invitations to portable computing devices 110 to be updated, reducing the update time.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "ha . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   determining, by an update manager, a number of portable computing devices to receive update data, the portable computing devices receiving data from one or more servers via a network;
   transmitting, during a first event, a first number of invitations to a first subset of the portable computing devices to receive the update data;
   receiving, at the update manager, data describing usage of the network during the first event;
   determining, by the update manager, an available bandwidth from the data describing usage of the network during the first event;
   determining, by the update manager, a second number of invitations from the determined available bandwidth, a size associated with the update data and a speed associated with the network; and
   transmitting, during a second event, the second number of invitations to a second subset of the portable computing devices to receive the update data.

2. The method of claim 1, wherein determining, by the update manager, the available bandwidth from the data describing usage of the network during the first event comprises:
   determining a difference between a threshold bandwidth and an amount of bandwidth used during the first event.

3. The method of claim 1, wherein determining, by the update manager, the second number of invitations from the available bandwidth, the size associated with the update data and the speed associated with the network comprises:
   calculating an update download time by dividing the size associated with the update data by the speed associated with the network; and
   calculating the second number of invitations by dividing the available bandwidth by the update download time.

4. The method of claim 1 further comprising:
   determining, by the update manager, whether a sum of the first number of invitations and the second number of invitations is less than the number of portable computing devices to receive the update data; and
   responsive to determining the sum is less than the number of portable computing devices to receive the update data, receiving, at the update manager, data describing usage of the network during the second event;
   determining, by the update manager, a modified available bandwidth from the data describing usage of the network during the second event;
   determining, by the update manager, a third number of invitations from the modified available bandwidth, the size associated with the update data and the speed associated with the network; and
   transmitting, during a third event, the third number of invitations to a third subset of the portable computing devices to receive the update data.

5. The method of claim 1, wherein the first number of invitations comprises a predetermined number of invitations.

6. The method of claim 1, wherein the first number of invitations comprises a predetermined percentage of the number of portable computing devices to receive the update data.

7. The method of claim 1, wherein transmitting, during the first event, the first number of invitations to the first subset of the portable computing devices to receive the update data comprises:
   transmitting identifiers associated with portable computing devices within the first subset to a server for transmission to the portable computing devices associated with the identifiers.

8. An apparatus comprising:
   a processor;
   a communication unit coupled to the processor, the communication unit configured to receive data describing usage of a network and to transmit an invitation to update data to one or more portable computing devices;
   a storage device coupled to the processor and to the communication unit, the storage device including:
   a status database storing data describing usage of the network received from the communication unit; and
   instructions that, when executed by the processor cause the processor to:

determine a number of portable computing devices to receive update data;
transmit, during a first event, a first number of invitations to a first subset of the portable computing devices to receive update data via the communication unit;
retrieve data describing usage of the network during the first event;
determine an available bandwidth from the data describing usage of the network during the first event;
determine a second number of invitations from the determined available bandwidth, a size associated with the update data and a speed associated with the network; and
transmit, during a second event, the second number of invitations to a second subset of the portable computing devices to receive update data via the communication unit.

9. The apparatus of claim 8, wherein determine the available bandwidth from the data describing usage of the network during the first event comprises:
determining a difference between a threshold bandwidth and an amount of bandwidth used during the first event.

10. The apparatus of claim 8, wherein determine the second number of invitations from the available bandwidth, the size associated with the update and the speed associated with the network comprises:
calculating an update download time by dividing the size associated with the update by the speed associated with the network; and
calculating the second number of invitations by dividing the available bandwidth by the update download time.

11. The apparatus of claim 8, wherein the storage device further includes instructions, that when executed by the processor, cause the processor to:
determine whether a sum of the first number of invitations and the second number of invitations is less than the number of portable computing devices to receive the update data; and
responsive to determining the sum is less than the number of portable computing devices to receive the update data, retrieve data describing usage of the network during the second event;
determine a modified available bandwidth from the data describing usage of the network during the second event;
determine a third number of invitations from the modified available bandwidth, the size associated with the update data and the speed associated with the network; and
transmit, during a third event, the third number of invitations to a third subset of the portable computing devices to receive the update data using the communication unit.

12. The apparatus of claim 8, wherein the first number of invitations comprises a predetermined number of invitations.

13. The apparatus of claim 8, wherein the first number of invitations comprises a predetermined percentage of the number of portable computing devices to receive the update data.

14. The apparatus of claim 8, wherein transmit, during the first event, the first number of invitations to the first subset of the portable computing devices to receive update data via the communication unit comprises:
transmitting identifiers associated with portable computing devices within the first subset to a server for transmission to the portable computing devices associated with the identifiers.

15. The apparatus of claim 8, wherein retrieve data describing usage of the network during the first event comprises:
retrieving data from the status database stored during the first event.

16. The apparatus of claim 8, wherein the storage device further includes a reporting database including data copied from the status database at a predetermined time interval.

17. The apparatus of claim 16, wherein retrieve data describing usage of the network during the first event comprises:
retrieving data from the reporting database.

18. A non-transitory computer readable storage medium storing instructions that, when executed by a processor, cause the processor to:
determine a number of portable computing devices to receive update data, the portable computing devices receiving data from one or more servers via a network;
transmit a first number of invitations to a first subset of the portable computing devices to receive the update data during a first event;
receive data describing usage of the network during the first event;
determine an available bandwidth from the data describing usage of the network during the first event;
determine, a second number of invitations from the determined available bandwidth, a size associated with the update data and a speed associated with the network; and
transmit a second event, the second number of invitations to a second subset of the portable computing devices to receive the update data.

19. The non-transitory computer readable storage medium of claim 18, wherein determine the available bandwidth from the data describing usage of the network during the first event comprises:
determining a difference between a threshold bandwidth and an amount of bandwidth being used.

20. The non-transitory computer readable storage medium of claim 18, wherein determine the second number of invitations from the available bandwidth, the size associated with the update data and the speed associated with the network comprises:
calculating an update download time by dividing the size associated with the update data by the speed associated with the network; and
calculating the second number of invitations by dividing the available bandwidth by the update download time.

* * * * *